US009323795B2

(12) United States Patent
Blain et al.

(10) Patent No.: US 9,323,795 B2
(45) Date of Patent: *Apr. 26, 2016

(54) SYSTEM AND METHOD FOR PROVIDING STRUCTURED DATA TO A STRUCTURED OR UNSTRUCTURED GRID

(71) Applicant: The United States of America, as represented by the Secretary of the Navy, Washington, DC (US)

(72) Inventors: Cheryl Ann Blain, Slidell, LA (US); Robert S. Linzell, Carriere, MS (US); Brett D. Estrade, SugarLand, TX (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/182,561

(22) Filed: Feb. 18, 2014

(65) Prior Publication Data

US 2014/0164438 A1    Jun. 12, 2014

Related U.S. Application Data

(63) Continuation of application No. 13/332,992, filed on Dec. 21, 2011, now Pat. No. 8,655,924, which is a continuation-in-part of application No. 12/579,112, filed on Oct. 14, 2009, now Pat. No. 8,112,455.

(60) Provisional application No. 61/105,448, filed on Oct. 15, 2008.

(51) Int. Cl.
*G06F 17/30* (2006.01)

(52) U.S. Cl.
CPC .... *G06F 17/30312* (2013.01); *G06F 17/30569* (2013.01)

(58) Field of Classification Search
None
See application file for complete search history.

(56) References Cited

U.S. PATENT DOCUMENTS

| | | | | |
|---|---|---|---|---|
| 6,411,406 B1 * | 6/2002 | Kreuzer | ................ | G01N 23/20 359/1 |
| 6,718,346 B1 * | 4/2004 | Brown | .............. | G06F 17/30595 379/112.06 |
| 6,964,010 B1 * | 11/2005 | Sharp | .................... | G06F 3/0481 714/46 |
| 7,239,311 B2 * | 7/2007 | Dunn | ...................... | G06T 17/05 345/419 |
| 7,463,258 B1 * | 12/2008 | Drury | .................... | G06T 17/05 345/419 |

(Continued)

OTHER PUBLICATIONS

Luettich et al. "ADCIRC: An Advanced Three-Dimensional Circulation Model for Shelves, Coasts, and Estuaries. Report 1. Theory and Methodology of ADCIRC-2DDI and ADCIRC-3DL". 1992. Coastal Engineering Research Center. Department of the Army. Vicksburg, MS.*

(Continued)

*Primary Examiner* — James E Richardson
(74) *Attorney, Agent, or Firm* — US Naval Research Laboratory; Scott G. Bell (57) ABSTRACT

A system and method for converting structured data to unstructured or structured data, the system and method receiving processing options in a flexible format and a reader selection, executing the reader selection to read data, computing a date time group to iterate through observed and/or modeled data, bilinearly interpolating the structured data to create an unstructured or structured finite element mesh, linearly interpolating data in time if necessary, and storing the populated grid on a computer-readable medium in a format compatible with a target numerical model.

14 Claims, 6 Drawing Sheets

(56) References Cited

U.S. PATENT DOCUMENTS

| | | | | |
|---|---|---|---|---|
| 7,523,391 | B1* | 4/2009 | Eizenhoefer | G06F 3/04895 707/999.1 |
| 7,620,536 | B2* | 11/2009 | Chow | G05B 17/02 702/66 |
| 8,112,455 | B2 | 2/2012 | Blain | |
| 8,438,467 | B2 | 5/2013 | Blain | |
| 8,655,924 | B2 | 2/2014 | Blain | |
| 2004/0122596 | A1* | 6/2004 | Sudhakar | G01V 1/42 702/17 |
| 2005/0143909 | A1* | 6/2005 | Orwant | G01S 5/0294 701/408 |
| 2006/0020563 | A1* | 1/2006 | Coleman | G06N 3/049 706/20 |
| 2007/0185653 | A1* | 8/2007 | Bresch | G01W 1/10 702/3 |
| 2008/0170791 | A1* | 7/2008 | Eskildsen | G06K 9/48 382/199 |
| 2009/0232377 | A1* | 9/2009 | Miao | G06T 11/006 382/131 |
| 2010/0094597 | A1* | 4/2010 | Blain | G06T 17/20 703/1 |
| 2010/0131879 | A1 | 5/2010 | Blain | |
| 2010/0226589 | A1* | 9/2010 | Mukherjee | G06T 17/205 382/264 |
| 2012/0150918 | A1 | 6/2012 | Blain | |

OTHER PUBLICATIONS

Westerink et al. "ADCIRC: An Advanced Three-Dimensional Circulation Model for Shelves, Coasts, and Estuaries. Report 2. User's Manual for ADCIRC-2DDI". 1994. Army Engineer Waterways Experiment Station. Department of the Army. Vicksburg, MS.*

Blain et al. "Software Design Description for the Advanced Circulation Model for Shelves, Coastal Seas, and Estuaries (ADCIRC)". 2001. Naval Research Laboratory. Stennis Space Center, MS.*

Scheffner et al. "Real-time predictions of surge propagation". 1997. Malcolm L. Spaulding (Ed.), Estuarine and Coastal Modeling, ASCE.*

Magnusson et al. "Artefacts and remedies in direct Fourier tomographic reconstruction," Nuclear Science Symposium and Medical Imaging Conference, 1992., Conference Record of the 1992 IEEE , vol. 2, No. 25-31, pp. 1138-1140.*

Averbuch et al. "3D Fourier based discrete Radon transform". Jul. 2003. Applied and Computational Harmonic Analysis. vol. 15, Issue 1. pp. 33-69.*

Ata Bilgili, Battri: A two-dimensional bathmymetry based unstructured triangular grid generator for finite element circulation modeling, Sep. 2005.*

Lesue, Jacob Scott Lesue, Calibrating ADCIRC with tidal constituents using SMS as a preprocessor, Dept, of Civil an< Environmental engineering, Aug. 2003, pp. 1-70.*

Chapter 3, NPL Publication "Chapter 3 fort.14 File Domain Mesh," Aug. 28, 2007.*

Cameron L. McDonald, NPL Publication "Automatic, Unstructured mesh generation for 2D shelf-based tidal models" Dec. 2006.*

Cheryl Ann Blain, MeshGUI, a mesh generation and editing toolset for the ADCIRC model, Feb. 8, 2008.*

Ata Bilgili, Battri: A two-dimensional bathymetry based unstructured triangular grid generator for finite element circulation modeling, Sep. 2005.*

Ata bilgili, Battri-2D triangular grid generator, version 11.11.03, Nov. 14, 2003 E Di Lorenzo, ROMS Tutorials, Feb. 2008.*

Makef15:An ADCIRC Model Fort.15, Input File Creation GUI for Parameter Specification and Periodic Boundary Forcing; NRL/MR/7320-079081; Naval Research Laboratory, Cheryl Ann Blain, Robert S. Linzell, Dec. 7, 2007.*

Makef22:An ADCIRC Model Fort.22, Input File Creation Tool for Surface, Wind and Pressure Forcing, NRL/ MR/7320-07-9082, Naval Research Laboratory, Cheryl Ann Blain, Robert S. Linzell, Brett Estrade, Dec. 7, 2007.*

MeshGUI: A Mesh Generation and Editing Toolset for the ADCIRC Model, NRL/MR/7322-08-9083, Naval Research Laboratory, Cheryl Ann Blain, Robert S. Linzell, T. Chris Massey, Feb. 8, 2008.*

* cited by examiner

SYSTEM AND METHOD FOR PROVIDING STRUCTURED DATA TO A STRUCTURED OR UNSTRUCTURED GRID

CROSS-REFERENCE TO RELATED APPLICATIONS

This application is a continuation of pending U.S. patent application Ser. No. 13/332,992 entitled SYSTEM AND METHOD FOR PROVIDING STRUCTURED DATA TO A STRUCTURED OR UNSTRUCTURED GRID filed on Dec. 21, 2011, which is a continuation-in-part of U.S. Pat. No. 8,112,455, entitled FORT.22 FILE CREATION TOOL, filed on Oct. 14, 2009, which claims priority to U.S. Provisional Patent Application No. 61/105,448, entitled UNSTRUCTURED GRID COASTAL MODELING TOOLS, filed on Oct. 15, 2008. The entire contents of all applications are hereby incorporated by reference.

BACKGROUND

The present teachings relate generally to a file creation tool and the conversion of structured data for populating a grid, either structured or unstructured. In one embodiment, the present teachings relates to a file creation tool that creates a surface wind and pressure forcing file, fort.22 file, in a format appropriate for the ADvanced CIRCulation (ADCIRC) model.

ADCIRC is a system of computer programs that solves time dependent, free surface circulation and transport problems in two and three dimensions. The equations discretized within the ADCIRC model are often used to represent coastal ocean dynamics. Typical ADCIRC applications have included: (i) modeling tides and wind driven circulation, (ii) analysis of hurricane storm surge and flooding, (iii) dredging feasibility and material disposal studies, (iv) larval transport studies, (v) near shore marine operations.

Execution of such a numerical model of the coastal ocean requires the specification of surface meteorological data such as winds and atmospheric pressure. The fort.22 file, specific to the ADCIRC model nomenclature, is the text file containing the needed meteorological data that will be used as model forcing. The data are prescribed at every node in the model's unstructured mesh of triangles. Typically, the process of preparing the fort.22 file, or any data file used as input to as numerical model, is extremely tedious and time-consuming because of the large amount of information from different sources that is required.

Accordingly, there remains a need for a method or system that provides a user with a tool within which to facilitate the reading, interpolation and time series creation of meteorological forcing that can come from a range of external sources with different formats and grid structures.

SUMMARY

The creation of an ADvanced CIRCulation (ADCIRC) Model Surface Wind and Pressure Forcing File (i.e., fort.22 file), and other similar files, has been overly burdensome because of the range of external sources with different formats and grid structures that are involved. The present teachings satisfy the above-described need by providing a tool to facilitate the reading, interpolation and time series creation of, for example, but not limited to, meteorological forcing that can come from these many external sources. Additionally, the tool also facilitates the preparation of, for example, but not limited to, a surface forcing time series for a model simulation, handling such functions as ramping the forcing values and/or extending the time series by several different means.

According to one aspect of the present teachings, a method for creating a file such as, for example, but not limited to, a fort.22 input file is provided that can include the steps of receiving a plurality of user parameters, the plurality of user parameters including, for example, but not limited to, one or more meteorological data sources, a defined date range, and a data processing request. Then, the one or more data sources can be read for the defined date range. A properly formatted output file can then be prepared based on the reader data. Next, it can be determined whether a data processing request is present, and if a data processing request is present, an extension/ramping processing program can be performed. Finally, the output file can be provided to a computer-readable medium.

For another aspect of the present teachings, a method for creating a file such as, for example, but not limited to, a fort.22 input file can be provided that includes the steps of providing a plurality of user parameters, the plurality of user parameters including one or more data sources, a defined date range, and a data processing request. Next, the user can execute a driver utility, for example, but not limited to, from a command line, and after processing, the user can receive an output file incorporating data sources, for example, but not limited to, meteorological data sources, for the defined data range.

In a further embodiment, the system and method of the present teachings can provide structured data to an unstructured or structured grid. The method can include, but is not limited to including, the steps of (a) receiving from a computer-readable medium processing options including start date, end date, and time increment; (b) receiving from a computer-readable medium a reader selection; (c) automatically calculating a current date; (d) automatically setting a current date time group based on the start date, the end date, and the time increment; (e) automatically reading data from a computer-readable medium using the reader selection and based on the start date; (f) automatically processing the data based on the received processing options; (g) if the grid is structured, automatically bilinearly interpolating the processed data and automatically populating the grid with the bilinearly interpolated processed data; (h) if the current date time group is the same as the calculated current date, automatically storing the populated grid on a computer-readable medium; (i) if the current date time group is not the same as the calculated current date, automatically linearly interpolating the bilinearly interpolated processed data in time, automatically populating the grid with the linearly interpolated processed data, and automatically storing the populated grid on the computer-readable medium; and (j) if the calculated current date is before or the same as the end date, automatically updating the current date/time group and executing steps (d)-(j).

The system of the present embodiment for populating a grid can include, but is not limited to including, an electronic receiver receiving processing options including start date, end date, time increment, and a reader selection; an electronic date management processor calculating a current date and setting a current date time group based on the start date, the end date, and the time increment, the date management processor updating the current date/time group, the driver invoking the data reader, the data processor, and the grid populator if the calculated current date is before or the same as the end date; an electronic data reader reading data using the reader selection and based on the start date; an electronic data processor processing the data based on the received processing options, the data processor bilinearly interpolating the processed data if the grid is structured, the data processor linearly interpolating the bilinearly interpolated processed data in time if the current date time group is not the same as the calculated current date; and an electronic grid populator populating the grid with the bilinearly interpolated processed data and, if the current date time group is the same as the calculated current date, the grid populator populating the grid with the linearly interpolated processed data, and storing the populated grid on the computer-readable medium.

These and other aspects and features of the present teachings will become apparent from the following detailed description of the exemplary embodiments, read in conjunction with, and with reference to, the accompanying drawings.

BRIEF DESCRIPTION OF THE DRAWINGS

Referring now to the drawings, in which like numerals represent like elements, aspects of the exemplary embodiments will be described in connection with the drawing set.

DETAILED DESCRIPTION

The problems set forth above, as well as further and other problems, are solved by the present teachings. These solutions and other advantages are achieved by the various embodiments of the teachings described herein below.

By way of example, ADCIRC is a highly developed numerical model for solving the equations of motion for a moving fluid on a rotating earth. ADCIRC can be run either as a two-dimensional depth integrated (2DDI) model or as a three-dimensional (3D) model. In order to run the numerical model, a plurality of input files is utilized. For example, the Surface Wind and Pressure Forcing file, or fort.22 file, is a text file containing meteorological data that will be used as model forcing.

The present teachings provide a tool that is configured to create input files a new fort.22 file, which can subsequently be input into the ADCIRC model. The tool, which can also be described as the makef22 utility or makef22 tool, can also read and process an existing fort.22 file in order to elongate the record either by adding zero valued records at the beginning of the fort.22 file or by repeating the first time record a specified number of times, and/or ramp a specified portion of the fort.22 records from zero to full-scale values. The makef22 tool was designed so that readers for new data sources can easily be developed and incorporated into the tool. Surface wind and pressure data sources on rectangular, regular grids at known times are read and interpolated onto an ADCIRC finite element mesh (FEM) at user-specified times. The results can be stored in an ASCII text, ADCIRC model specific, fort.22 forcing file.

Figure 1:
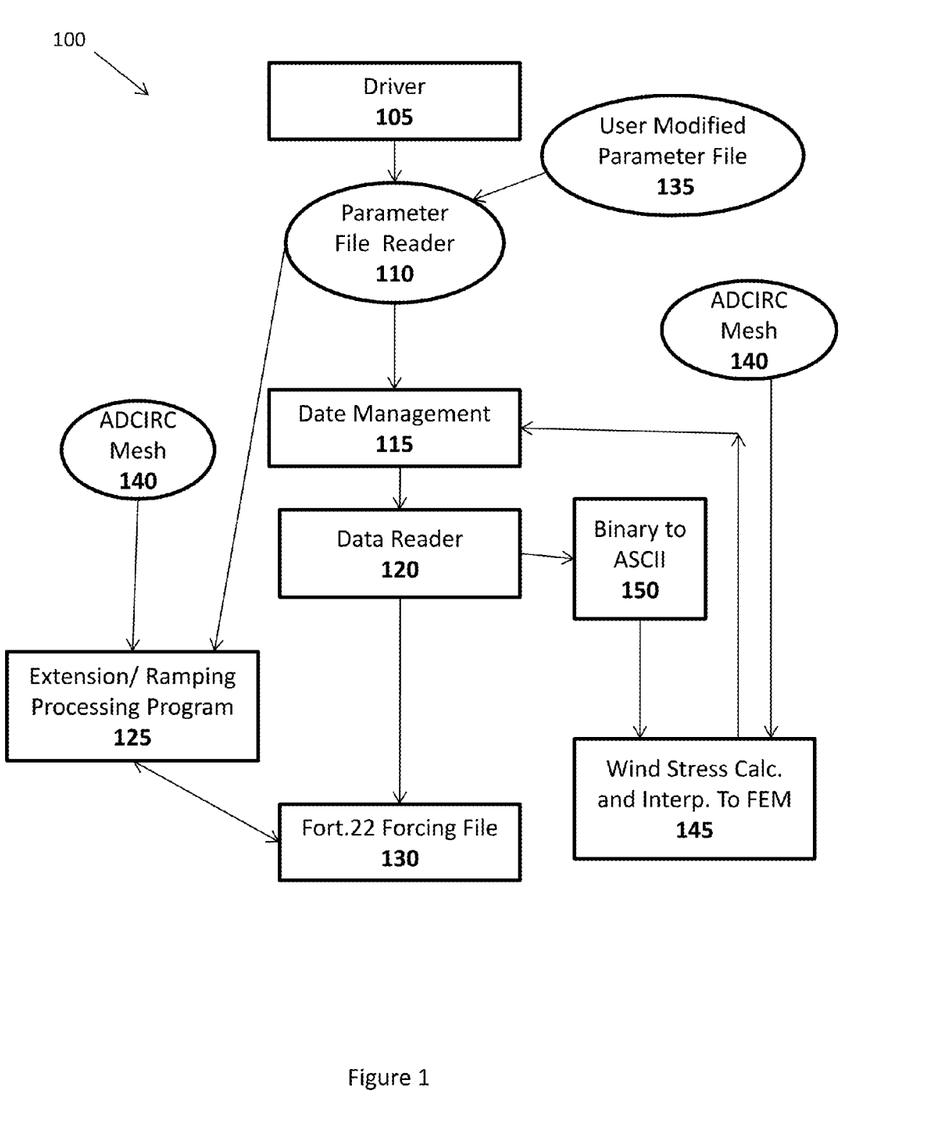
FIG. 1 is a schematic block diagram of the system of one embodiment of the present teachings illustrating the data flow and relationship between the components.

Referring now to FIG. 1, system 100 for creating forcing data for a numerical model can include, but is not limited to including, driver 105, which can be implemented as a makef22 utility, and can be invoked by executing a Perl script, makef22.pl, from, for example, but not limited to, a command line. Driver 105 could be executed automatically, or invoked from another script, as well. If the creation of a new fort.22 file 130 from user-supplied meteorological data is desired, the option to process an existing fort.22 file can be disabled. Input parameter file reader 110 can load user-supplied parameters 135 from an ASCII text file. Driver 105 can control execution of other components, including input of user parameters by an input module, and, for creation of a new output file, looping over time values by the date iteration module, and invoking data reader 120 for each time step. For modification of an existing data file, driver 105 can receive input, and can invoke a binary executable processing program to perform requested processing steps. Driver 105 can perform basic error checks of the user inputs. In some cases, erroneous or missing input parameters cannot be corrected or set to default values, so the program can issue a status message and can halt execution. For example, the parameter, ramp, indicating whether a new data file is to be created or an existing one is to be modified, can be checked for existence. If it does not exist, which means that the parameter was misnamed or excluded from the input file, it is created and set to zero to indicate that a new file is to be created. If this parameter exists and is set to unity, then the corresponding data modification parameters are checked for existence and correctness. If any of the processing parameters do not exist (i.e., were misnamed or excluded), or if any are less than the allowed minimum values, driver 105 can print an error message and halt execution.

If a new data file is to be created, the following error checks can be implemented. The reader directory name parameter can be checked for existence, and if it does not exist, a certain environment variable can be checked for existence. If this environment variable does not exist, the reader directory parameter can be created and set to a default directory. The name of the binary executable data reformatting program, usually required by data reader 120, can be checked for existence. If this parameter does not exist, then a default program that is embedded in the Perl code can be compiled prior to execution of data reader 120. The default program will be used by data reader 120 as the data reformatting program. Existence of the name of data reader 120 can be checked. If this parameter does not exist, driver 105 can issue an error message and halt execution.

Date management component 115, or date iterator, is used to facilitate iteration over a specified range of dates. Using the date iterator 115, the main driver 105 iterates over a date range specified by starting and ending dates or a date range and hourly time increment. Date management 115 can generate a sequence of text strings containing date and time values that are used in other modules of system 100 to control input and output and to perform linear interpolation in time. Each input and output data record has associated with it a date and time. This association facilitates all processing capabilities that pertain to time. Inputs to date management 115 can be supplied in a flexible format, except for the starting time. In one embodiment, date management can require a starting date/time group (DTG) of the form "YYYYMMDDHH" in which YYYY is a four-digit year (e.g., "2011"), MM is a two-digit month (e.g., "01" for January), DD is a two-digit day of the month (e.g., "01" for the first day of the month given by MM), and HH is a two-digit hour of the day in 24 hr notation (e.g., "00" for midnight). These input parameters can be supplied in user modified file 135, for example, an ASCII text file, which is read at the program startup by the input parameter file reader 110. For each date/hour in the range, data reader 120 is invoked. Date management 115 can require an ending DTG, and the format of this parameter can be flexible. It can be the same "YYYYMMDDHH" format as the starting time, or can be a time increment relative to the start time. The latter format can be a combination of hours, days, months and/or years relative to the start time, and is supplied in the format "#h#d#m#y" where "#h" indicates an integer followed by the letter "h" to indicate the number of hours. Similarly, "#d" indicates an integer followed by the letter "d" for days, "#m" indicates an integer followed by the letter "m" for months, and "#y" indicates an integer followed by the letter "y" for years. The order of the parameters can be arbitrary. For example, "2 m3 d4 h" indicates that the ending time is 2 months, 3 days and 4 hours past the start time. An increment specified as "4 h3 d2 m" means the same as "2 m3 d4 h."

System 100 can require a time increment in the same "#h#d#m#y" format as the ending time. For example, an increment specified as "3 h" means 3 hr, and an increment specified as "1 d12 h" indicating an increment of 1 day and 12 hr, i.e., 36 hr. This parameter also can be in arbitrary order; an increment of "1 d12 h" means the same as "12 h1 d." Time increments can be given in fractions of an hour provided data reader 120 supports such small time increments. Driver 105 can iterate through time beginning at the starting DTG and ending at the ending DTG. The number of time steps is determined by the length of time divided by the increment. Date management 115 is invoked to provide a DTG value at each time step, and data reader 120 reads the data and performs other tasks as described elsewhere. Once the ending time is reached, driver 105 performs any needed finalization, and program execution is terminated.

All details regarding the meteorological data, such as the location and naming convention of the data files, are handled by the data reader 120. The data reader 120 facilitates the reading and interpolation of the surface wind and pressure data, and is responsible for returning the data for the requested date/hour in the proper format, for example, but not limited to, fort.22 format. Either driver 105 or data reader 120 can send the data returned from the data reader 120 directly to a computer-readable medium. After all the processing is completed, the result is a forcing file 130, for example, but not limited to, a fort.22 forcing file, which is a meteorological forcing file for the ADCIRC code.

Each data type has a reader specific to that type. The data can be the output of another environmental model, for example, and can be, for example, IEEE binary format. While input data are structured, i.e. gridded using a regular grid, output data can be structured or unstructured. In order to provide support for as yet unknown data formats, system 100 can accommodate plug-in data reader programs to read input data, interpolate input data, convert a structured grid to an unstructured grid, and write formatted data. The driver program is unchanged, while the needed data reader is specified, for example, by parameters in the input parameter file. In an exemplary embodiment, data reader 120 is written in, contained within, or invoked by a Perl module that initializes the reader using the chosen options, prints reader information (no input is needed), retrieves data based on the date/time text string, and performs any final tasks before finishing. Data reader 120 further writes the final data to a computer-readable medium using formats and file names compatible with the target numerical model.

In an alternative exemplary embodiment, an existing forcing file can be processed. In this embodiment, extension/ramping processing program 125 is invoked to perform the extension and/or ramping of the original data found in the existing forcing file 130 and create a new forcing file to be used as input to the numerical model. To create a new forcing file, system 100 can be provided a numerical model (e.g. ADCIRC) grid file, data for the region and the date/time range and increment specified, a reader for data, and an input parameter file. To modify an existing forcing file, system 100 can be provided a numerical model (e.g. ADCIRC) grid file, a numerical model wind file, predetermined times (number of time steps) for zero-padding and ramping, for example, to coincide with the numerical model spin-up period, and an input parameter file. More than one forcing file corresponding to different combinations of zero-padded or record repetition extension and ramping can be created when modifying an existing forcing file.

A more detailed explanation of the components and process of FIG. 1 are described below. In an exemplary embodiment, a user executes the driver 105, or makef22 utility, by invoking the Perl script, makef22.pl, from a command line. The output of the makef22.pl code is directed to the fort.22 file 130, a meteorological forcing file for the ADCIRC code. In one example, makef22.pl is invoked from the command line using the input parameters specified in the makef22.pl.in user modified file 135. The input parameters contained in the input file makef22.pl.in 135 are defined in Table 1 below.

TABLE 1

Input Parameters

| Parameter | Req | Description | Valid values |
|---|---|---|---|
| Start | Y | Start date | YYYYMMDDHH (required format) |
| End | Y | End date; an actual date can be specified or a relative period of time after the start date. The values described in the "Valid Values" column can be combined. For example, "2m3d4h" will end 2 months, 3 days, and 4 hours after the start date. | YYYYMMDDHH, or #h—hours past start, #d—days after start, #m—months after start, #y—years after start |
| Inc | Y | Temporal increment that the date range specified by start/end is stepped through; the values described in the "Valid Values" column can be combined. For example, "2m3d4h" will increment 2 months 3 days and 4 hours for each iteration. | #h—hours, #d—days, #m—months, #y—years, |

TABLE 1-continued

Input Parameters

| Parameter | Req | Description | Valid values |
|---|---|---|---|
| Reader | Y | Data reader name. | Data reader name is the name of the reader file without the extension (.pl or .pm) |
| Readeropts | Y | Data reader options; options must be enclosed in quotes. | Depends on reader |
| Readerdir | N | Directory in which to find the appropriate data reader specified using the "reader" flag. May also be set as the environmental variable "F22_READER_DIR"; Overrides the "F22 _READER_DIR" environmental variable. If the environmental variable is not set, and this option is not used, the default directory searched is "./readers". | Any valid Unix directory path |
| Readerbin | [N] | Name of binary executable data reader program. | gmt2f22_navo_gmt, or any valid Unix file name (program must already exist). |
| Arch | [N] | Computer architecture specification and associated Fortran compiler information; passed to reader as an option flag of the same name. If set, the specified value will override the auto-detected one. | Architecture types as defined internally inside the reader. |
| f14 | Y | Location of a grid file. | Any valid Unix file path to a valid grid file (e.g. fort.14) |
| Ramp | Y | Processing Flag; indicates whether data generation or processing is to be done. | Zero (0) if no processing will be done (i.e., a new fort.22 file will be generated), or one (1) if processing will be done. |
| Norig | [N] | The number of time steps from the original fort.22 file to use. | Required only if ramp = 1; must be 1 or greater. Enter a large number (e.g., 999) if the number is unknown. |
| Nback | [N] | The number of background/zero-valued time steps that are pre-pended to the output file. | Required only if ramp = 1; 0 for no zero-valued records, or greater than 0 to create zero-valued records. |
| Ncopy | [N] | The number of copies of the first original data record (time step). | Required only if ramp = 1; 0 or greater. If set to 0 and nramp > 0, ramping will be applied to zero-valued records and/or original data, depending on values of nstart and nramp. |
| Nramp | [N] | The number of time steps over which to apply the ramping function. | Required only if ramp = 1; set to 0 for no ramping (i.e., zero-valued records &/or extending only), or greater than 0 to apply ramping. |
| Nstart | [N] | The time step at which to start applying the ramping function. | Required only if ramp = 1; 1 or greater; ignored if nramp = 0. |
| Domain | [N] | Specifies which domain to use. | |
| O | [N] | Specifies output options: PW reads pressure and wind files, PS reads pressure and precomputed wind stress files, P reads pressure and outputs 0 values for wind stress fields, W reads wind files and outputs 0 values for pressure fields, and S reads stress files and outputs 0 values for pressure fields. | |
| Recstart | [N] | Specific record number to start a record count | |
| Numtimerec | [N] | Number of time records per file to read starting at the beginning of the file | |

Within the makef22.pl.in user modified file 135, a user can define the start date/hour of the desired wind and pressure data (e.g., 2004011200) followed by information about either the termination date of the data (e.g., 2004011400) or the length of the data record to be read. In this example, the data to be read will extend for two days (e.g., 2 d) at six-hour increments (e.g., 6 h). The six-hour increment corresponds to a wind time increment (WTIMINC) of 21600 seconds. The ADCIRC model will read new meteorological data every WTIMINC seconds. Next, the makef22.pl.in user modified file 135 can specify the file name for an ADCIRC grid, or ADCIRC Mesh 140, to be used for interpolation. This file name is typically the fort.14 file The makef22.pl.in user modified file 135 can also specify the directory location for the data readers (e.g., ~/makef22pl/readers), and a specific data reader 120 can be identified. An exemplary data reader 120 can be referred to as "navo_gmt" (e.g., navo_gmt). On the next line, makef22.pl.in user modified file 135 can provide the name of a pre-compiled binary file containing the data reader (e.g., gmt2f22_navo_gmt). Next, the parameter specifications for the meteorological data can be passed to the reader 120 through the specified reader options, "readeropts". The reader options can include data type (e.g., "-O PW") to indicate pressure and wind velocities, the alias for the spatial domain that corresponds to a domain definition in the reader (e.g., -domain CENT_AM_New), and the directory location of the meteorological data (e.g., -datadir/data/atmos/regions).

In connection with the parameters listed above in Table 1, and the above text, an example makef22.pl.in user modified file 135 is provided below.

```
# makef22.pl.in -- Input parameter file for makef22.pl.
2004011200   # start
2004011400   # end
6h           # inc
fort.14      # f14
~/makef22pl/readers # readerdir
navo_gmt     # reader
-O PW -domain CENT_AM -datadir / data/atmos/regions # readeropts
i686         # arch
1            # ramp
7            # norig
11           # nback
6            # ncopy
6            # nramp
11           # nstart
```

Input parameters are listed in the makef22.pl.in user modified file 135. This ASCII text file contains values for all required parameters, although some may not be used during each execution of the program. Not all parameters need to be included. Each parameter is on a single line, including the "readeropts" parameter. The parameter name, the "#" symbol, and the column after the "#" symbol in the second and subsequent lines, must be included, and must be surrounded by at least one space. There may be additional text following the parameter name, but this is not a requirement. The parameter names should not be repeated within the file. In this example, the value of "ramp" is 1, so that extension and/or ramping is to be performed on an existing fort.22 file. In the Makef22 system, input options are received by the system by means of invoking a file input function, named GetUserInput.pm, which reads data from an ASCII text parameter file. This module is invoked by the driver program. The input parameter file must be named makef22.pl.in, and must reside in the user's current working directory. Creation or modification of this file can be performed, for example, but not limited to, by the user with an appropriate software tool (e.g., a text editor) prior to executing the Makef22 system. The input parameter file can contain certain values, but the order of these values is arbitrary. The required parameters depend on the type of processing to be performed, specifically, creation of a new data file or modification of an existing data file. When a new data file is to be created, the following processing options, listed here by name, must be present: start (starting date/time group), end (ending date/time group or time increment), inc (time increment), reader (reader program name), readeropts (reader program options), readerdir (optional directory name where reader program resides), readerbin (optional name of binary data reader program), f14 (name of finite element mesh file), and ramp (flag indicating whether processing of an existing file is to be performed; should be set to zero in this mode of operation). To illustrate the format of any one of these lines, an example is provided here for the start parameter: 2011010100 # start where the first field "2011010100" indicates 00 hr on Jan. 1, 2011, the "#" symbol follows the parameter value, and "start" is the parameter name. In this example, one or more blank spaces separate each of the three fields. The data processing options required for modifying an existing data file, described below, can be present, but will be ignored if nramp is zero.

In the exemplary embodiment, to modify an existing data file, the following processing options can be used: ramp (flag as earlier described; should be set to one in this mode of operation), norig (number of time steps of original data to be used for processing), nback (number of time steps to use for background or zero-valued output at the beginning of the output data file), ncopy (number of copies of the first original data record), nramp (number of time steps over which to apply the ramping function), and nstart (time step at which to start applying the ramping function). The format is the same as earlier described. The earlier described processing options can be present, but will be ignored if nramp is one.

The data reader 120, such as navo_gmt.pm, which is used for reading the Generic Mapping Tools (GMT) network Common Data Form (netCDF) file format used by the Naval Oceanographic Office (NAVOCEANO), is a Perl script called by the driver 105. All readers are specified by the "reader" option of the makef22.pl.in user modified file 135. Other example data readers 120 include nrl_coamps.pm, a makef22.pl-compatible data reader specifically designed to read Naval Research Laboratory (NRL) binary Coupled Ocean/Atmosphere Mesoscale Prediction System (COAMPS®) files; nrl_nogaps.pm, a makef22.pl-compatible data reader specifically designed to read NRL binary Navy Operational Global Atmospheric Prediction System (NOGAPS) files; and nrl_coamps_nogaps.pm, a makef22.pl-compatible data reader specifically designed to read NRL binary COAMPS and NOGAPS files. The Binary to ASCII tool 150 is a standalone data reformatting tool that can convert, for example, binary numerical model output files to ASCII text format. One of ordinary skill in the art will understand the different types of data readers to be used with different sources of data. The data readers 120 differ in the sources of component parameters in which they support. Table 2 presents a summary of the parameter flags used in conjunction with the O option (see Table 1) and the corresponding meteorological forcing parameters.

TABLE 2

Parameter Flags for makef22.pl.in and the Meteorological Forcing Parameters

| Parameter Flag | Meteorological Forcing Parameter |
|---|---|
| P | Atmospheric Pressure Reduced to Mean Sea Level |
| W | Wind Stress Components Calculated from Wind Velocity Components |
| S | Wind Stress Components |
| R | Net Shortwave Radiation |
| I | Net Long Wave Radiation |
| L | Latent Heat Flux |
| N | Sensible Heat Flux |
| Z | Wind Velocity Components |

Data reader 120 can compile code into an executable if no binary executable program is supplied, locate the requested data files, and call the reader executable for each date/hour that is requested. Data reader 120 can track the number of files read, and manage the proper formatting of the data for the forcing file 130 based on what record is being written.

Wind stress, if computed, can be computed using the formula of Garratt (1977). Wind stresses can be in units of Pressure/Length$^2$ or in SI, N/m$^2$, and can be divided by the reference density of water to get units of Length$^2$/Time$^2$ (SI or metric units are determined by the units of the gravitational constant g specified in the ADCIRC fort.15 parameter file). The surface pressure can be represented by units of Pressure or in SI, Pa, and can be divided by the reference density of water multiplied by g to get units of length.

The data can then be interpolated onto the numerical model grid 140. Wind and pressure data sources can be defined over rectangular regions using regularly-spaced points. The numerical model grid 140 is can be composed of irregularly shaped triangles whose vertices or nodes are also irregularly spaced. Interpolation of the wind and pressure data from a rectangular grid onto the FEM is performed using bilinear interpolation 145. Because of the need to interpolate the data onto the FEM, an existing numerical model data file for the region of interest may be required.

If no precompiled binary data reader program is specified, the computer architecture can be detected automatically, and the appropriate compiler options can be extracted from inside the reader source code file. However, if a custom setting is added to the compiler database, the architecture using the use the optional "arch" line specification (e.g., i686) to override the architecture detected by the program.

In an alternative exemplary embodiment, if the processing mode is specified, the option to process an existing forcing file is enabled. Processing an existing forcing data file can be performed by, for example, but not limited to, a standalone extension/ramping processing program 125. One option within the extension/ramping processing program 125 can be the expansion of the number of records prior to the beginning existing forcing data file using a user-specified number of zero records (i.e., the wind velocity or stress U- and V-components are zero, and the atmospheric pressure is a "background" [i.e., ambient] value, such as 10 m).

For example, there may be instances where the user wishes to have the non-zero wind and pressure forcing start at a time later than at the start of a numerical model simulation. For example, a long ramp-up period may be necessary for the application of tidal forcing but wind and pressure forcing may not available during the entire ramping phase. In such cases, the wind and atmospheric pressure fields could be initially set to zero or some background value, or the first available wind and pressure record could be repeated for a specified length of time during the model spin-up period. This type of accommodation can be necessary when applying wind and pressure forcing within a particular numerical model, since the numerical model could expect wind and pressure forcing to extend from the start to the end of a simulation. In the above scenario, where non-zero wind and pressure forcing fields are applied after the ramp duration that occurs internal to the numerical model code, the initial forcing values may be gradually increased to full scale (i.e., "ramped") to avoid the generation of numerical artifacts.

Figure 2:
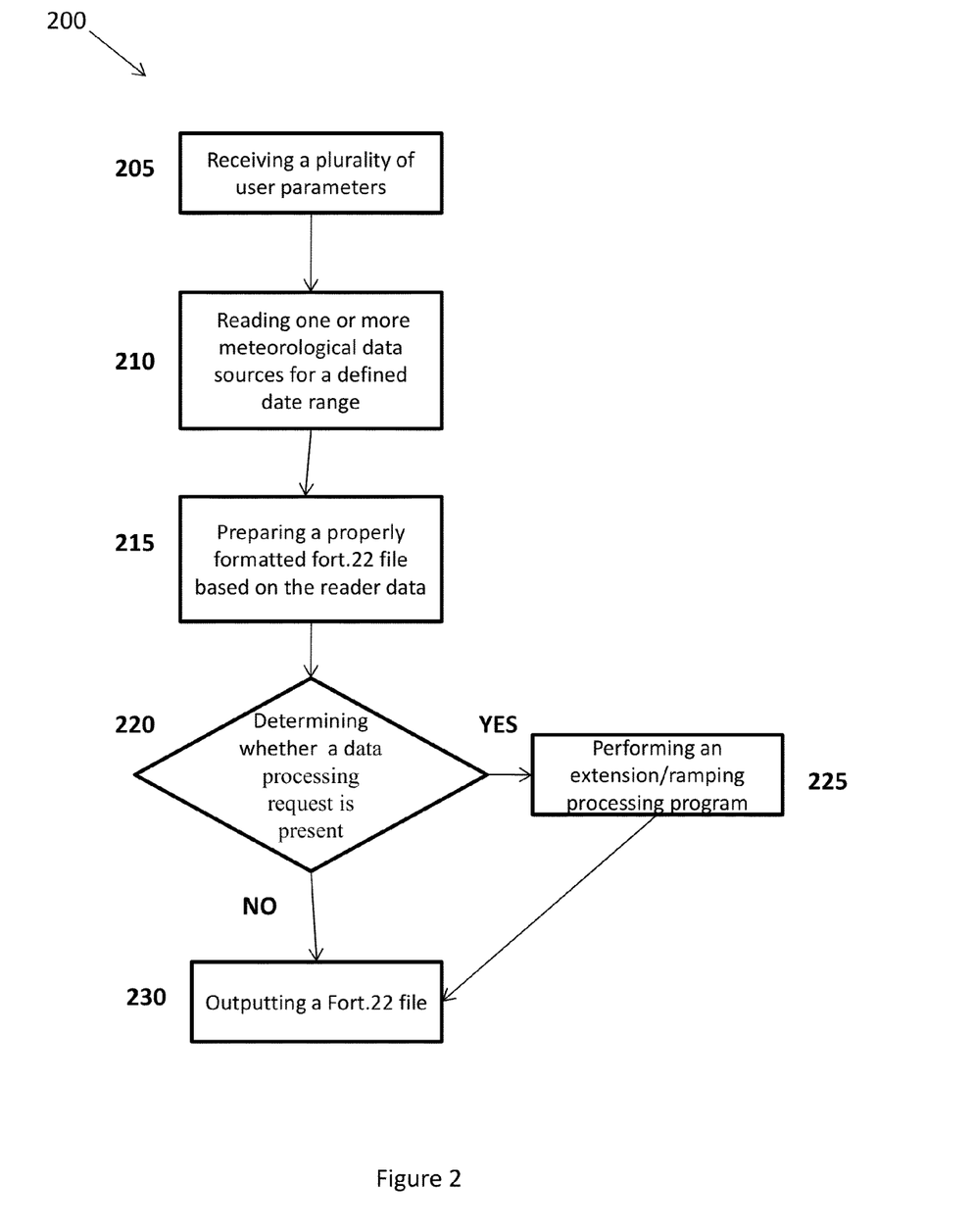
FIG. 2 is a flow chart representing an exemplary embodiment of one aspect of the present teachings.

Referring now to FIG. 2, method 200 can include, but is not limited to including, the step of receiving 205 a plurality of user parameters, where the plurality of user parameters can include one or more data sources and a defined date range. The plurality of user parameters can also include a data processing request. Method 200 can also include the steps of reading 210 one or more data sources by a data reader over a time period provided in the defined date range, and preparing 215 a forcing file based on the reader data. If 220 a data processing request is present in the user parameters, method 200 can further include the step of performing 225 extension/ramping processing. Method 200 can also include the step of outputting 230 to a computer-readable medium the forcing file.

Figure 3:
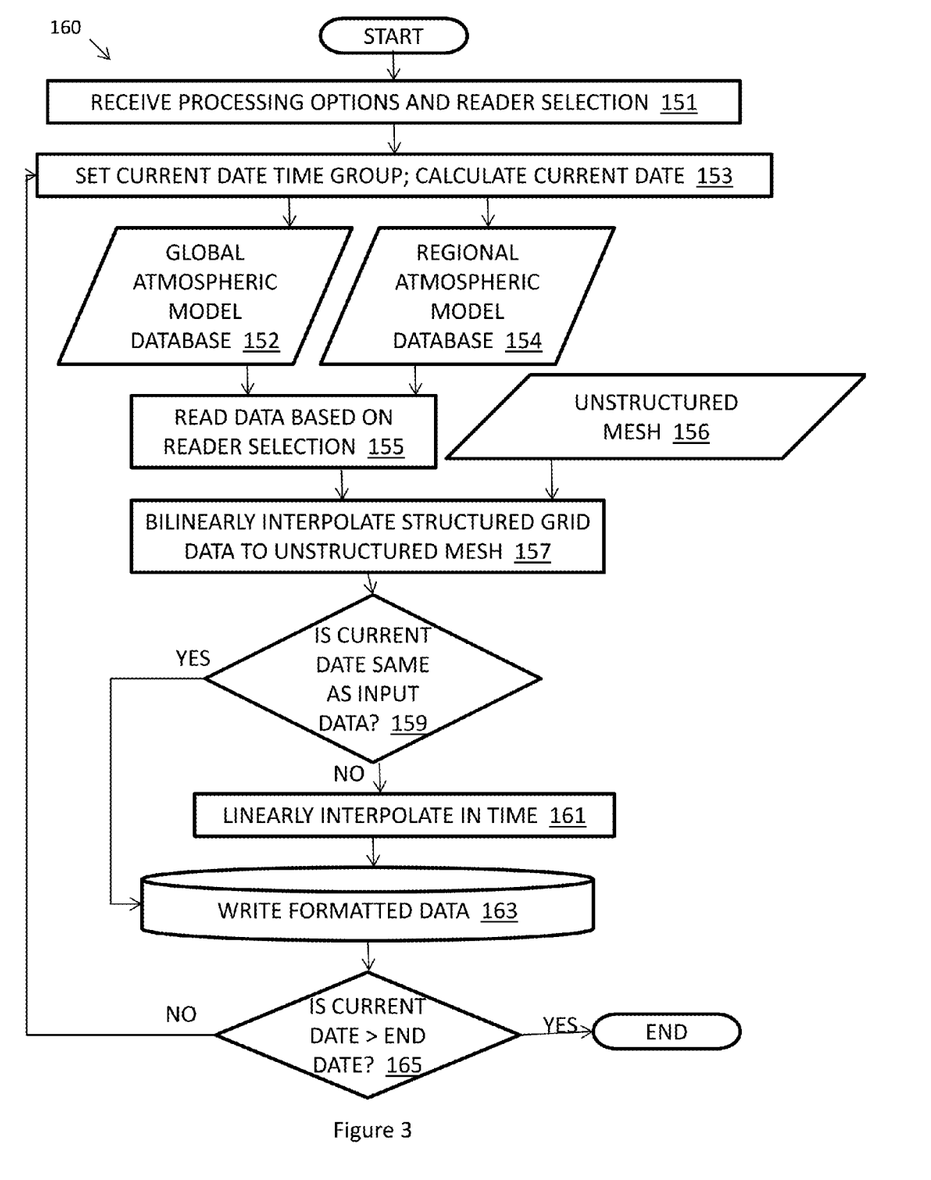
FIG. 3 is a flowchart representing an exemplary embodiment of another aspect of the present teachings.

Referring now to FIG. 3, method 160 for populating a grid can include, but is not limited to including, the steps of: (a) receiving 151 processing options including start date, end date, and time increment; (b) receiving 151 a reader selection; (c) calculating 153 a current date; (d) setting 153 a current date time group based on the start date, the end date, and the time increment; (e) reading 155 data, including but not limited to, global atmospheric model database 152 and regional atmospheric model database 154, using the reader selection and based on the start date; (f) processing the data based on the received processing options; (g) if the grid is structured, bilinearly interpolating 157 the processed data and populating the unstructured grid 156 with the bilinearly interpolated processed data; (h) if 159 the current date time group is the same as the calculated current date, storing 163 the populated grid on a computer-readable medium; (i) if 159 the current date time group is not the same as the calculated current date, linearly interpolating 161 the bilinearly interpolated processed data in time, populating the grid with the linearly interpolated processed data, and storing 163 the populated grid on the computer-readable medium; and (j) if 165 the calculated current date is before or the same as the end date, updating the current date/time group and executing steps (d)-(j). The step of receiving processing options can include, but is not limited to including, the steps of receiving the start date in a preselected start date format, receiving the end date in any of the formats from a group of end date formats, and receiving the time increment in an arbitrary order sorted by preselected keys. The step of setting a current date time group can include, but is not limited to including, the steps of determining the start date from the received start date, parsing the received end date to determine the end date, and parsing the time increment to determine the time increment. Method 160 can optionally include the step of constraining the reader selection to be provided in a preselected language, the reader selection receiving reader options, printing reader information, retrieving data based on the current date time group, automatically ending a data reading session, and writing data to the computer-readable medium in a numerical model-compatible format.

Figure 4:
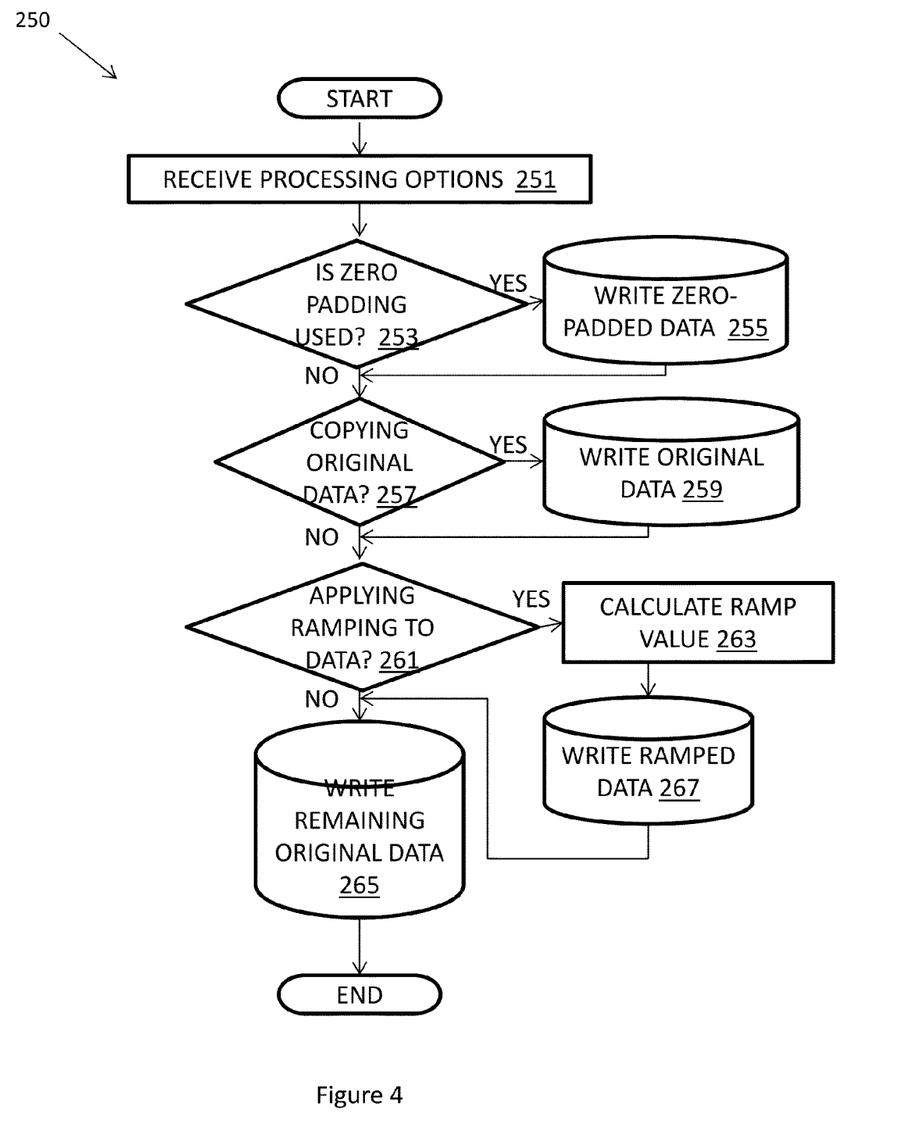
FIG. 4 is a flowchart representing an exemplary embodiment of the ramping feature of the present teachings.

Referring now to FIG. 4, method 250 for producing processed data can include, but is not limited to including, the step of receiving 251 processing options and data. If 253 zero padding is used, method 250 can include the step of prepending 255 a background number of zero-padded time steps to the data. If 257 original data are to be copied, method 250 can include the step of copying 259 a first record copy number of original data to the prepended data. If 261 ramping is to be applied to the data, method 250 can include the steps of calculating 263 ramped value by ramping the specified original data based on the received processing options and writing 267 ramped data, and appending 265 a preselected number of original data values to the ramped, copied, prepended data. The step of processing the data can include, but is not limited to including, the steps of receiving a time step number of time steps in the data, receiving a background number of background zero-padded time steps to be prepended to the data, receiving a first record copy number of copies of a first original data record of the data, receiving a ramped record number 325 (FIG. 5) of a number of time steps to include the ramped values, receiving a ramping starting time step, and creating processed data by selecting from the group of steps consisting of prepending the background number of zero-padded time steps to the data, copying the first record copy number to the prepended data, ramping the copied prepended data based on the received ramping starting time step and the ramped record number 325 (FIG. 5) of time steps, and appending a preselected number of original data values to the ramped, copied, prepended data.

Figure 5:
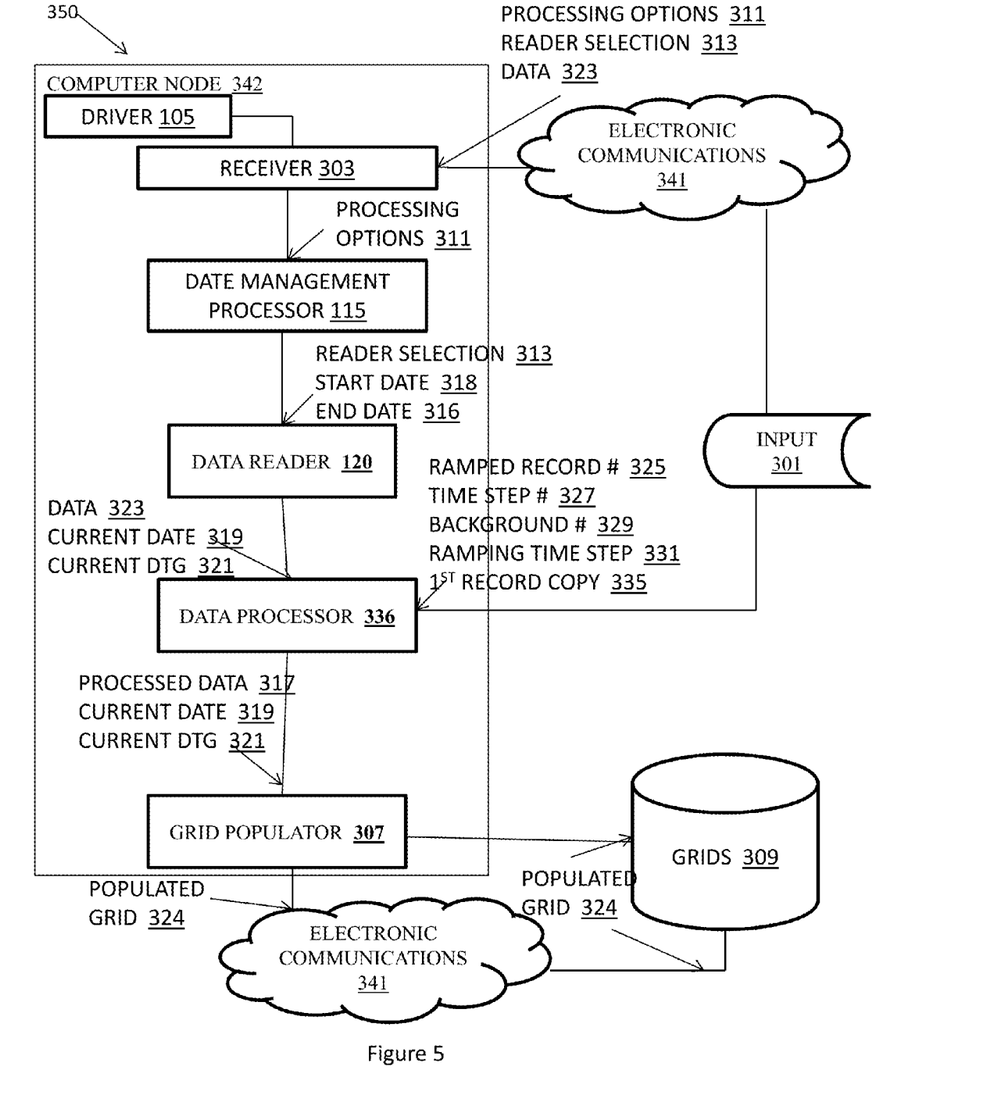
FIG. 5 is a schematic block diagram of the system of another embodiment of the present teachings.

Referring now to FIG. 5, system 350 of computer-executable code stored on computer-readable media for populating a grid can include, but is not limited to including, electronic receiver 303 receiving, possibly through electronic communications 341 from input 301, processing options 311 including start date 318, end date 316, time increment, and reader selection 313. System 350 can also include electronic date management processor 115 calculating current date 319 and setting current date time group 321 based on start date 318, end date 316, and the time increment. Date management processor 115 can update current date/time group 321, invoke data reader 120, data processor 336, and grid populator 307 if calculated current date 319 is before or the same as end date 316. System 350 can also include electronic data reader 120 reading data using reader selection 313 and based on start date 318. System 350 can still further include electronic data processor 336 processing data 323 based on the received processing options 311. Data processor 336 can also bilinearly interpolate processed data 317 if the grid is structured. Data processor 336 can linearly interpolating the bilinearly interpolated processed data in time if current date time group 321 is not the same as calculated current date 319. System 350 can still further include electronic grid populator 307 populating the grid with the bilinearly interpolated processed data 317 and, if current date time group 321 is the same as calculated current date 319, grid populator 307 can populate the grid with the linearly interpolated processed data 317, and store populated grid 324 on grids 309 directly or through, for example, electronic communications 341. Electronic receiver 303 can include computer executable code stored on computer-readable media executing the steps of receiving the start date in a preselected start date format, receiving the end date in any of the formats from a group of end date formats, and receiving the time increment in an arbitrary order sorted by preselected keys. Electronic date management processor 115 can include computer executable code stored on computer-readable media executing the steps of determining the start date 318 from the received start date, parsing the received end date to determine the end date 316, and parsing the time increment to determine the time increment. Electronic data processor 336 can include computer executable code stored on computer-readable media executing the steps of receiving a time step number of time steps 327 in the data, receiving a background number 329 of background zero-padded time steps to be prepended to the data, receiving a first record copy number 335 of copies of a first original data record of the data, receiving a ramped record number 325 of a number of time steps 327 to include the ramped values, receiving a ramping starting time step 331, and creating processed data 317 by selecting from the group of steps consisting of prepending the background number 329 of zero-padded time steps to the data, copying the first record copy number 335 to the prepended data, ramping the copied prepended data based on the received ramping starting time step 331 and the ramped record number 325 of time steps 327, and appending a preselected number of original data values to the ramped, copied, prepended data. Electronic data reader 120 can include computer executable code stored on computer-readable media executing the steps of receiving reader options, printing reader information, retrieving data based on the current date time group 321, automatically ending a data reading session, and writing data to the computer-readable medium in a numerical model-compatible format.

Figure 6:
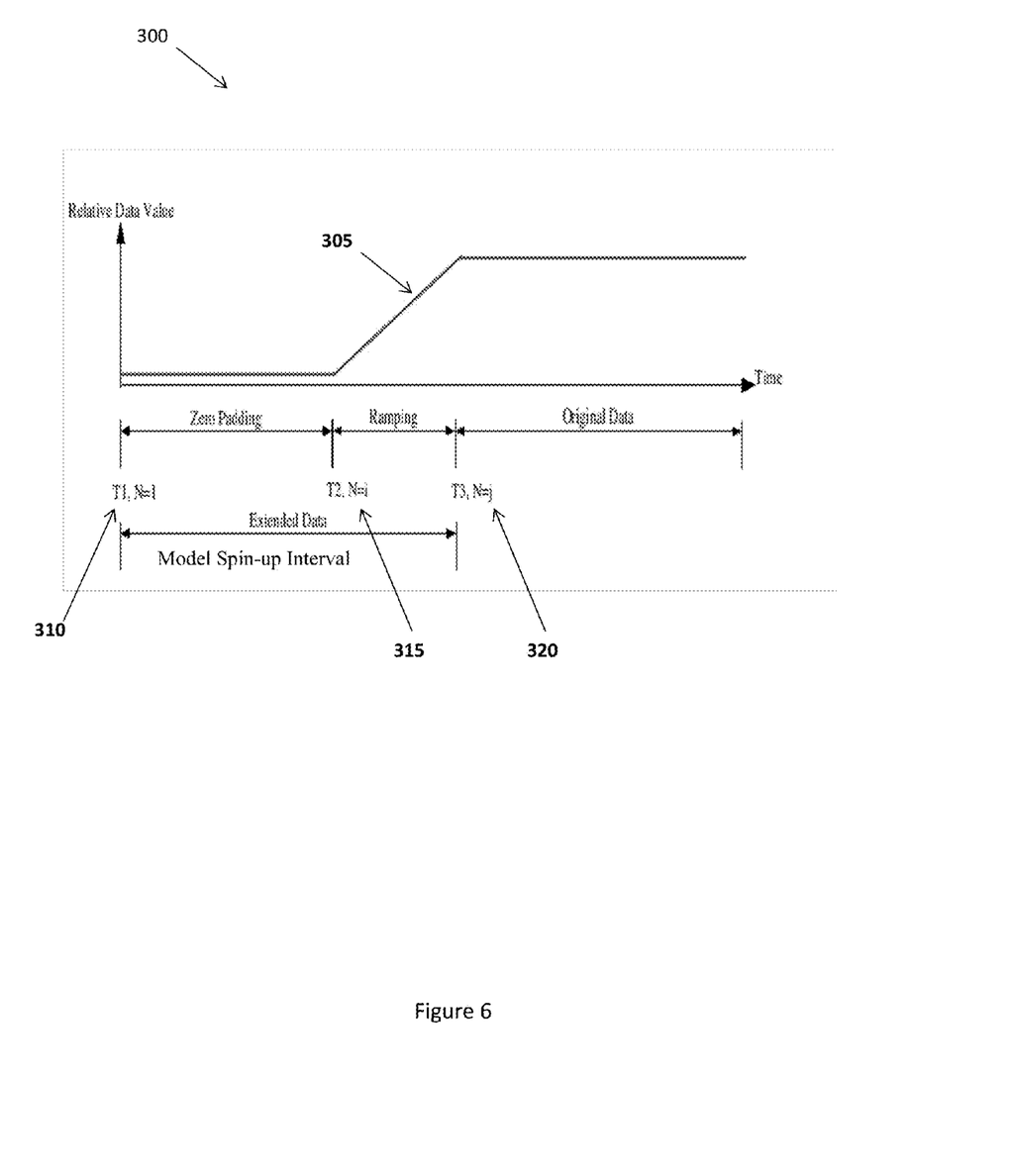
FIG. 6 is a diagram illustrating the application of features available in the extension/ramping processing program in accordance with an exemplary embodiment of the present teachings.

Referring now to FIG. 6, application of features 300 illustrates the features available in the extension/ramping processing program 125 (FIG. 1) in accordance with an exemplary embodiment of the present teachings. In FIG. 6, the line 305 represents an idealized time series of a meteorological forcing data value, such as atmospheric pressure. At time T1 310 (time step N=1), which would correspond to the start time of the model run, the data values are set to zero, zero-padding (or a background value, such as 10 m for atmospheric pressure). This initial value is maintained up to time T2 315 (time step N=i). From time T2 315 to T3 320 (N=j), the first non-zero data value is copied, and a ramp function is applied. Over this time interval, the data gradually increase to full value at the end of the ramp period, T3 320.

In this example, the original forcing file data values extend from the time step following T3 320 (N=j+1) to the end of the time series. Thus the original data set has been extended by the sum of the zero-padded interval (T1 310 to T2 315, i time steps) and the ramped interval (T2 315 to T3 320, j−i time steps). During a numerical model run, the ramp period for the forcing of interest would correspond to the time interval T1 310 to T3 320 (j time steps). The time steps in this example refer to the data interval of the original meteorological data, e.g., three hours. The forcing files can contain no time information so can require a constant data interval for the entire record. Hence, input to the processing program, can be provided as numbers of time steps instead of hours or some other time increment. More specifically, extension/ramping processing program 125 can require five inputs: (1) the number of records to read from the original file (for example, the number of time steps of the original forcing file to use), (2) background ("zero") records needed (the number of zero-padded time steps that are prepended to the output file based on the length of the numerical model run and how much spin-up is desired), (3) number of copies of the first record (i.e., time step; if no ramping is desired, the value can be greater than zero to extend the data that many time steps, or it can be zero to zero-pad the beginning of the data set; if ramping is desired and the value is set to zero, the ramping function will be applied to either the zero-padded values (if any) and/or the original data, depending on the time step at which ramping starts and the interval over which ramping is applied), (4) ramped records needed (number of time steps over which ramping will be performed), and (5) at which record will the ramped records start (the time step at which the ramping will commence).

Raw data and results from the computations of the systems and methods present embodiments can be stored for future retrieval and processing, printed, displayed, transferred to another computer, and/or transferred elsewhere. Electronic communications 341 (FIG. 5) from which data 323 (FIG. 5) can be received and through which populated grid 324 (FIG. 5) can be transmitted can be wired or wireless, for example, using cellular communication systems, military communications systems, and satellite communications systems. Any software required to implement the system can be written in a variety of conventional programming languages. The system, including any possible software, firmware, and hardware, can operate on a computer having a variable number of CPUs. Other alternative computer platforms can be used. The operating system can be, for example, but is not limited to, WINDOWS® or LINUX®.

Referring again primarily to FIGS. 2, 3, and 4, methods 160, 200, and 250 can be, in whole or in part, implemented electronically. Signals representing actions taken by elements of systems 100 (FIG. 1) and 300 (FIG. 5) and other disclosed embodiments can travel over at least one live communications network 341 (FIG. 5). Control and data information can be electronically executed and stored on at least one computer-readable medium such as, for example, grids 309 (FIG. 5). Systems 100 (FIG. 1) and 300 (FIG. 5) can be implemented to execute on at least one computer node 342 (FIG. 5) in at least one live communications network 341 (FIG. 5). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer-implemented method for populating an electronic numerical model grid comprising:
    automatically receiving a time step number of time steps in data from a computer-readable medium;
    automatically receiving a background number of background zero-padded time steps to be prepended to the data;
    automatically receiving a first record copy number of copies of a first original data record of the data;
    automatically receiving a ramped record number of a number of time steps to include the ramped values;
    automatically receiving a ramping starting time step;
    automatically creating processed data by prep ending the background number of zero-padded time steps to the data, copying the first record copy number to the prepended data, ramping the copied prepended data based on the received ramping starting time step and the ramped record number of time steps, and appending a preselected number of original data values to the ramped, copied, prepended data; and
    automatically populating the electronic numerical model grid with the processed data.

2. The method as in claim 1 further comprising:
    receiving a start date, an end date, and a time increment;
    reading the data from the computer-readable medium based on the received start date; and
    calculating a current date time group based on the start date, the end date, and the time increment.

3. The method as in claim 2 further comprising:
    receiving a reader selection in a preselected language, the reader selection enabling
    reading the data from the computer-readable medium, receiving reader options, printing reader information, retrieving data based on the current date time group, ending the data reading, and
    writing the processed data to the computer-readable medium in a format compatible with the electronic numerical model grid.

4. The method as in claim 2 further comprising:
    automatically receiving the start date in a preselected start date format;
    automatically receiving the end date in any of the formats from a group of end date formats; and
    automatically receiving the time increment in an arbitrary order sorted by preselected keys.

5. The method as in claim 2 further comprising:
    automatically determining the start date from the received start date;
    automatically parsing the received end date to determine the end date; and
    automatically parsing the time increment to determine the time increment.

6. A computer system for populating an electronic numerical model grid comprising:
    a computer processor executing computer code for causing:
        a data processor to automatically receive a time step number of time steps in data from a computer-readable medium, to automatically receive a background number of background zero-padded time steps to be prepended to the data, to automatically receive a first record copy number of copies of a first original data record of the data, to automatically receive a ramped record number of a number of time steps to include the ramped values, to automatically receiving a ramping starting time step, to automatically create processed data by prepending the background number of zero-padded time steps to the data, to automatically copy the first record copy number to the prepended data, to automatically ramp the copied prepended data based on the received ramping starting time step and the ramped record number of time steps, and to automatically append a preselected number of original data values to the ramped, copied, prepended data; and
    a grid populator to automatically populate the electronic numerical model grid with the processed data.

7. The system as in claim 6 wherein the computer processor executes the computer code for further causing:
    a data reader to receive the start date in a preselected start date format, receiving the end date in any of the formats from a group of end date formats.

8. The system as in claim 7 wherein the computer processor executed the computer code for further causing:
    an electronic data receiver to automatically receive reader options;
    the data reader to automatically retrieve the data based on the current date time group, and to automatically end the data retrieval; and
    the data processor to automatically provide the appended, ramped, copied, prepended data to the grid populator.

9. The system as in claim 7 wherein the computer processor executes the computer code stored on computer-readable media for further causing the data reader to determine the start date from the received start date, to parse the received end date to determine the end date, and to parse the time increment to determine the time increment.

10. A computer-implemented system stored on a non-transitory computer-readable medium for populating an electronic numerical model grid comprising:
    computer-executable code executing:
        automatically receiving a time step number of time steps in data from a computer-readable medium;

automatically receiving a background number of background zero-padded time steps to be prepended to the data;

automatically receiving a first record copy number of copies of a first original data record of the data;

automatically receiving a ramped record number of a number of time steps to include the ramped values;

automatically receiving a ramping starting time step;

automatically creating processed data by prepending the background number of zero-padded time steps to the data, copying the first record copy number to the prepended data, ramping the copied prepended data based on the received ramping starting time step and the ramped record number of time steps, and appending a preselected number of original data values to the ramped, copied, prepended data; and automatically populating the electronic numerical model grid with the processed data.

11. The computer-implemented system as in claim 10 further comprising computer-executable code executing:

receiving a start date, an end date, and a time increment;

reading the data from the computer-readable medium based on the received state date; and calculating a current date time group based on the start date, the end date, and the time increment.

12. The computer-implemented system as in claim 11 further comprising computer-executable code executing:

receiving a reader selection in a preselected language, the reader selection enabling reading the data from the computer-readable medium, receiving reader options, printing reader information, retrieving data based on the current date time group, ending the data reading, and writing the processed data to the computer-readable medium in a format compatible with the electronic numerical model grid.

13. The computer-implemented system as in claim 11 further comprising computer-executable code executing:

automatically receiving the start date in a preselected start date format;

automatically receiving the end date in any of the formats from a group of end date formats; and automatically receiving the time increment in an arbitrary order sorted by preselected keys.

14. The computer-implemented system as in claim 11 further comprising computer-executable code executing:

automatically determining the start date from the received start date;

automatically parsing the received end date to determine the end date; and automatically parsing the time increment to determine the time increment.

\* \* \* \* \*